(12) United States Patent
Hirokubo et al.

(10) Patent No.: US 8,947,782 B2
(45) Date of Patent: Feb. 3, 2015

(54) WAVELENGTH VARIABLE INTERFERENCE FILTER, OPTICAL MODULE, AND LIGHT ANALYZER

(75) Inventors: Nozomu Hirokubo, Fujimi (JP); Koji Kitahara, Ina (JP)

(73) Assignee: Seiko Epson Company (JP)

( * ) Notice: Subject to any disclaimer, the term of this patent is extended or adjusted under 35 U.S.C. 154(b) by 161 days.

(21) Appl. No.: 13/219,925

(22) Filed: Aug. 29, 2011

(65) Prior Publication Data

US 2012/0120402 A1 May 17, 2012

(30) Foreign Application Priority Data

Nov. 12, 2010 (JP) ................................ 2010-253956

(51) Int. Cl.

| | | |
|---|---|---|
| G02F 1/03 | (2006.01) | |
| G02F 1/07 | (2006.01) | |
| G02B 27/00 | (2006.01) | |
| G02B 5/28 | (2006.01) | |
| G01J 3/26 | (2006.01) | |
| G01J 3/51 | (2006.01) | |

(52) U.S. Cl.
CPC ... *G02B 5/28* (2013.01); *G01J 3/26* (2013.01); *G01J 3/51* (2013.01)
USPC ............................ 359/578; 359/260; 359/589

(58) Field of Classification Search
USPC ................. 359/577–590, 260; 356/450–521; 156/99–109
See application file for complete search history.

(56) References Cited

U.S. PATENT DOCUMENTS

| | | | | |
|---|---|---|---|---|
| 2002/0167730 | A1* | 11/2002 | Needham et al. | 359/578 |
| 2005/0068627 | A1* | 3/2005 | Nakamura et al. | 359/578 |
| 2007/0242234 | A1* | 10/2007 | Gulvin et al. | 353/84 |
| 2010/0091372 | A1* | 4/2010 | Yamanoi et al. | 359/578 |
| 2010/0103522 | A1* | 4/2010 | Matsumoto | 359/578 |
| 2010/0142067 | A1* | 6/2010 | Hanamura et al. | 359/850 |
| 2010/0226029 | A1 | 9/2010 | Funasaka | |

FOREIGN PATENT DOCUMENTS

| | | |
|---|---|---|
| JP | 2006-343685 | 12/2006 |
| JP | 2006-343686 | 12/2006 |
| JP | 2006-350124 | 12/2006 |
| JP | 2006-350125 | 12/2006 |
| JP | 2009-134028 A | 6/2009 |
| JP | 2010-204457 | 9/2010 |

* cited by examiner

*Primary Examiner* — Jennifer L Doak
*Assistant Examiner* — Kimberly N Kakalec
(74) *Attorney, Agent, or Firm* — Harness, Dickey & Pierce, P.L.C.

(57) ABSTRACT

A wavelength variable interference filter includes: a first movable mirror disposed on a first substrate; a second movable mirror disposed so as to be opposed to the first movable mirror with a predetermined gap interposed therebetween; and an electrostatic actuator which varies the length of the gap between the mirrors. The first substrate has a first movable portion on which the first movable mirror is disposed, and a first linkage portion which holds the first movable portion in such a manner that the first movable portion can shift in the thickness direction of the substrate. The second substrate has a second movable portion on which the second movable mirror is disposed, and a second linkage portion which holds the second movable portion in such a manner that the second movable portion can shift in the thickness direction of the substrate.

8 Claims, 11 Drawing Sheets

WAVELENGTH VARIABLE INTERFERENCE FILTER, OPTICAL MODULE, AND LIGHT ANALYZER

BACKGROUND

1. Technical Field

The present invention relates to a wavelength variable interference filter which selects light having a desired target wavelength from incident light and releases the selected light, an optical module which includes this wavelength variable interference filter, and a light analyzer which includes this optical module.

2. Related Art

An optical filter (wavelength variable interference filter) which includes a pair of substrates each of which has a mirror disposed on a surface of the substrate on the side facing to the mirror of the other substrate is known (for example, see JP-A-2010-204457). This type of wavelength variable interference filter causes multiple interference of incident light between the pair of the mirrors, and allows only transmission of light having a particular wavelength and intensified by multiple interference.

A wavelength variable interference filter disclosed in JP-A-2010-204457 is provided with a first substrate and a second substrate disposed so as to be opposed to each other. An annular groove is formed on the surface of the first substrate on the side not facing to the second substrate so that a cylindrical movable portion positioned at the center of the first substrate and an annular diaphragm coaxial with the movable portion can be defined by the groove. A pair of electrodes are disposed so as to be opposed to each other between the pair of the substrates. Mirrors are provided both on the surface of the movable portion on the side facing to the second substrate and on the second substrate in such positions as to be opposed to each other. According to this structure, the diaphragm bends by the force of electrostatic attraction generated in response to voltage applied to the pair of the electrodes, and shifts the movable portion to which the mirror is attached in the thickness direction of the substrate for control of the gap between the pair of the mirrors. By this mechanism, the wavelength variable interference filter can select and transmit only light having the particular wavelength corresponding to the gap.

According to the wavelength variable interference filter disclosed in JP-A-2010-204457, the diaphragm is only provided on the first substrate. In this structure, reduction of the thickness of the diaphragm or enlargement of the area of the diaphragm in the plan view as viewed in the thickness direction of the substrates is required when the gap is desired to be narrowed by a large displacement amount of the movable portion. However, the diaphragm whose thickness is decreased or whose area is increased easily moves, and therefore the mirror provided on the movable portion easily shifts as well. In this case, the gap between the mirrors varies by external factors such as vibrations received from the outside, which possibly makes it difficult to provide the desired gap between the mirrors in correspondence with the applied voltage.

SUMMARY

An advantage of some aspects of the invention is to provide a wavelength variable interference filter, an optical module, and a light analyzer capable of providing a desired gap with high accuracy while reducing variations in the gap produced by external factors.

An aspect of the invention is directed to a wavelength variable interference filter including: a first substrate; a second substrate disposed so as to be opposed to the first substrate; a first reflection film provided on the surface of the first substrate on the side facing to the second substrate; a second reflection film provided on the second substrate and disposed so as to be opposed to the first reflection film with a predetermined gap interposed therebetween; and a gap varying unit which changes the length of the gap between the first reflection film and the second reflection film. The first substrate has a first movable portion on which the first reflection film is disposed, and a first linkage portion which holds the first movable portion in such a manner that the first movable portion can shift in the thickness direction of the first substrate. The second substrate has a second movable portion on which the second reflection film is disposed, and a second linkage portion which holds the second movable portion in such a manner that the second movable portion can shift in the thickness direction of the second substrate. The gap varying unit varies the length of the gap by shifting the first movable portion and the second movable portion relative to each other.

Generally, for shifting a movable portion by a predetermined displacement amount, decrease in the thickness of a diaphragm or increase in the area of the diaphragm in the plan view is required as explained above. In this case, variations in the gap may be produced due to external factors such as vibrations. According to the structure of this aspect of the invention, however, the first substrate and the second substrate have the first and second movable portions and the first and second linkage portions, respectively. Thus, when external factors such as vibrations are given to the first and second substrates, the first and second movable portions shift in the same direction, thereby reducing the variations in the gap length. Moreover, the respective linkage portions bend in directions closer to each other by the function of the gap varying unit, and the respective movable portions shift in directions closer to each other accordingly. In this case, the sum of the displacement amounts of the first movable portion and the second movable portion is only required to be equivalent to the displacement amount in the structure of the related art, which reduces each of the displacement amounts of the movable portions to a volume smaller than the corresponding amount of the structure of the related art. Thus, the thickness and the area of each of the linkage portions can be made larger than the corresponding thickness and area in the diaphragm of the related art, which decreases variations in the gap produced by the external factors. Accordingly, the gap can be accurately set at a desired length in accordance with applied voltage.

It is preferable that the wavelength variable interference filter of the aspect of the invention has the following structures. The first substrate has a first displacement unit provided with the first movable portion and the first linkage portion. The second substrate has a second displacement unit provided with the second movable portion and the second linkage portion. The first displacement unit and the second displacement unit are made of the same material and have the same shape.

According to this structure, the first displacement unit of the first substrate and the second displacement unit of the second substrate are made of the same material and have the same shape. Thus, the bend volumes of the first linkage portion and the second linkage portion produced when external factors are given thereto are equalized, whereby the displacement amounts of the first movable portion and the second movable portion become equivalent. In this case, the respective movable portions shift by the same displacement amount and in the same direction when the external factors such as vibrations are given thereto. Accordingly, variations in the gap can be further reduced.

It is preferable that the wavelength variable interference filter of the aspect of the invention has the following structures. The first displacement unit has a linearly symmetric shape with respect to a symmetry axis corresponding to a line which passes through the center line of the first linkage portion in the thickness direction of the first substrate and extending in parallel with the surface of the first reflection film in the cross-sectional view taken in the thickness direction of the first substrate. The second displacement unit has a linearly symmetric shape with respect to a symmetry axis corresponding to a line which passes through the center line of the second linkage portion in the thickness direction of the second substrate and extending in parallel with the surface of the second reflection film in the cross-sectional view taken in the thickness direction of the second substrate.

According to this structure, each of the displacement units has the linearly symmetric shape with respect to the symmetry axis corresponding to the line which passes through the center line of the linkage portion in the thickness direction of the substrate and extending in parallel with the reflection film.

In the case where the displacement units do not have a linearly symmetric structure, when the displacement units vibrate in the surface directions of the substrates due to external factors such as external vibrations, each of the displacement units receives a force in its surface direction. The forces acting on the displacement units become unbalanced, which varies the gap between the reflection films provided on the respective movable portions. According to the structure of this aspect of the invention, however, each of the displacement units has a linearly symmetric shape which provides a good balance of the forces acting on the displacement units in the surface directions. Thus, variations in the gap can be reduced even when the displacement units vibrate in the surface directions of the substrates.

Accordingly, the wavelength variable interference filter in this aspect of the invention can reduce variations in the gap even when external factors such as vibrations in the thickness directions or in the surface directions of the substrates are given to the wavelength variable interference filter.

It is preferable that the first substrate and the second substrate of the wavelength variable interference filter of the aspect of the invention are made of the same material and have the same shape.

According to this structure, the respective substrates are made of the same material and have the same shape. In this case, the variations in the gap can be reduced. Moreover, the manufacturing steps for the respective substrates can be equalized, which simplifies the manufacturing steps.

It is preferable that the wavelength variable interference filter of the aspect of the invention has the following structures. The gap varying unit has a first electrode provided on the surface of the first substrate facing to the second substrate, and a second electrode provided on the second substrate in such a position as to be opposed to the first electrode. A first bend prevention film is provided on the surface of the first substrate opposite to the surface where the first electrode is disposed as a bend prevention film made of the same material as that of the first electrode, and on the surface of the second substrate opposite to the surface where the second electrode is disposed as a bend prevention film made of the same material as that of the second electrode. A second bend prevention film is provided on the surface of the first substrate opposite to the surface where the first reflection film is disposed as a bend prevention film made of the same material as that of the first reflection film, and on the surface of the second substrate opposite to the surface where the second reflection film is disposed as a bend prevention film made of the same material as that of the second reflection film.

Generally, the coefficient of linear expansion which is dependent on the temperatures of the reflection films and the electrodes provided on the substrates varies when the environment temperature changes. In this case, the internal stresses of the reflection films and the electrodes vary, and may bend the substrates due to the temperature change.

According to the structure of this aspect of the invention, the first bend prevention film made of the same material as that of the electrode is provided on each surface of the substrates on the side opposite to the surface where the electrode is disposed, and the second bend prevention film made of the same material as that of the reflection film is provided on each surface of the substrates on the side opposite to the surface where the reflection film is disposed. In this case, the internal stresses of the electrodes and the reflection films acting on the substrates are balanced against the forces of the first and second bend prevention films acting on the substrates when the environment temperature changes. Thus, the respective substrates do not bend, and parallelism between the first and second reflection films is obtained. Accordingly, the resolution of the wavelength variable interference filter increases.

Another aspect of the invention is directed to an optical module including: the wavelength variable interference filter described above; and a light receiving unit which receives test target light transmitted by the wavelength variable interference filter.

According to this aspect of the invention, variations in the gap produced by external factors such as vibrations can be reduced similarly to the above aspect of the invention. Thus, the gap of the wavelength variable interference filter can be set at a desired length in accordance with applied voltage with high accuracy. Accordingly, the optical module can perform highly accurate measurement by using the light receiving unit.

Still another aspect of the invention is directed to a light analyzer including: the optical module described above; and an analyzing unit which analyzes light characteristics of the test target light based on light received by the light receiving unit of the optical module.

The light analyzer according to this aspect of the invention includes the optical module which has the wavelength variable interference filter described above. Thus, the light analyzer can perform highly accurate measurement, and thus can measure accurate spectral characteristics based on the measurement result.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

1. General Structure of Colorimeter

Figure 1:
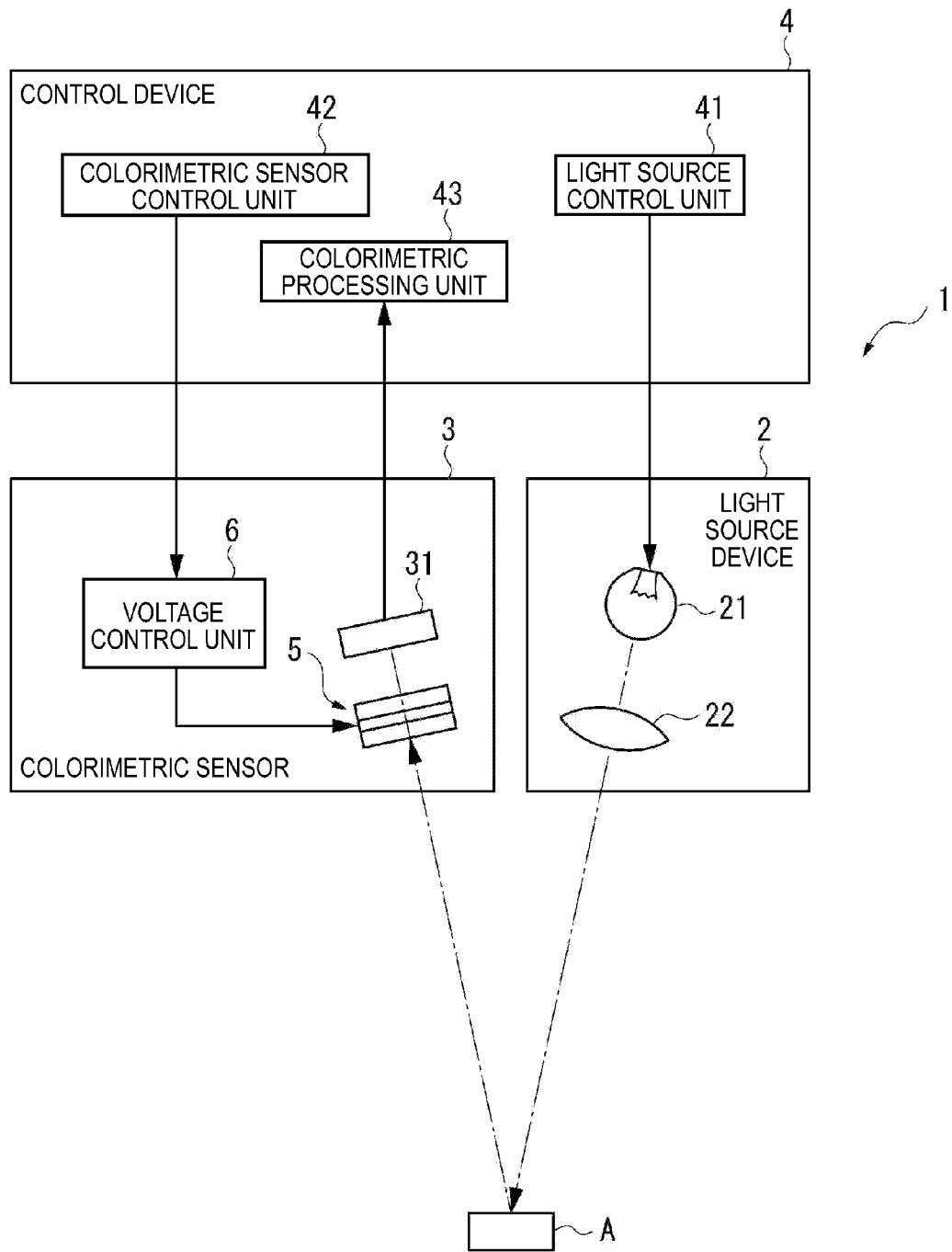
FIG. 1 is a block diagram showing the general structure of a colorimeter according to a first embodiment of the invention.

FIG. 1 is a block diagram showing the general structure of a colorimeter 1 (light analyzer) according to the first embodiment.

As illustrated in FIG. 1, the colorimeter 1 includes a light source device 2 which emits light toward a test target A, a colorimetric sensor 3 (optical module), and a control device 4 which controls the overall operation of the colorimeter 1. The colorimeter 1 is a system which analyzes and measures the chromaticity of test target light, that is, the color of the test target A based on a detection signal outputted from the colorimetric sensor 3 having received test target light emitted from the light source device 2 and reflected by the test target A.

2. Structure of Light Source Device

The light source device 2 includes a light source 21 and a plurality of lenses 22 (only one of these is shown in FIG. 1), and emits white light toward the test target A. The plural lenses 22 may include a collimator lens. In this case, the light source device 2 collimates the white light emitted from the light source 21 by the function of the collimator lens, and emits the collimated light from a not-shown projection lens toward the test target A. While the colorimeter 1 provided with the light source device 2 is discussed in this embodiment, the light source device 2 may be eliminated when the test target A is a light emission unit such as a liquid crystal panel.

3. Structure of Colorimetric Sensor

As illustrated in FIG. 1, the colorimetric sensor 3 includes an etalon 5 (wavelength variable interference filter), a light receiving element 31 (light receiving unit) which receives light having passed through the etalon 5, and a voltage control unit 6 which varies the wavelength of light that can pass through the etalon 5. The colorimetric sensor 3 has a not-shown entrance optical lens disposed at the position opposed to the etalon 5 to introduce light reflected by the test target A (test target light) into the etalon 5. The colorimetric sensor 3 divides light having a predetermined wavelength from the test target light received from the entrance optical lens by using the talon 5, and receives the divided light via the light receiving element 31.

The light receiving element 31 constituted by a plurality of photo-electric switching elements produces electric signals corresponding to the received amounts of lights. The light receiving element 31 is connected with the control device 4 to output the generated electric signals to the control device 4 as light reception signals.

3-1. Structure of Etalon

Figure 2:
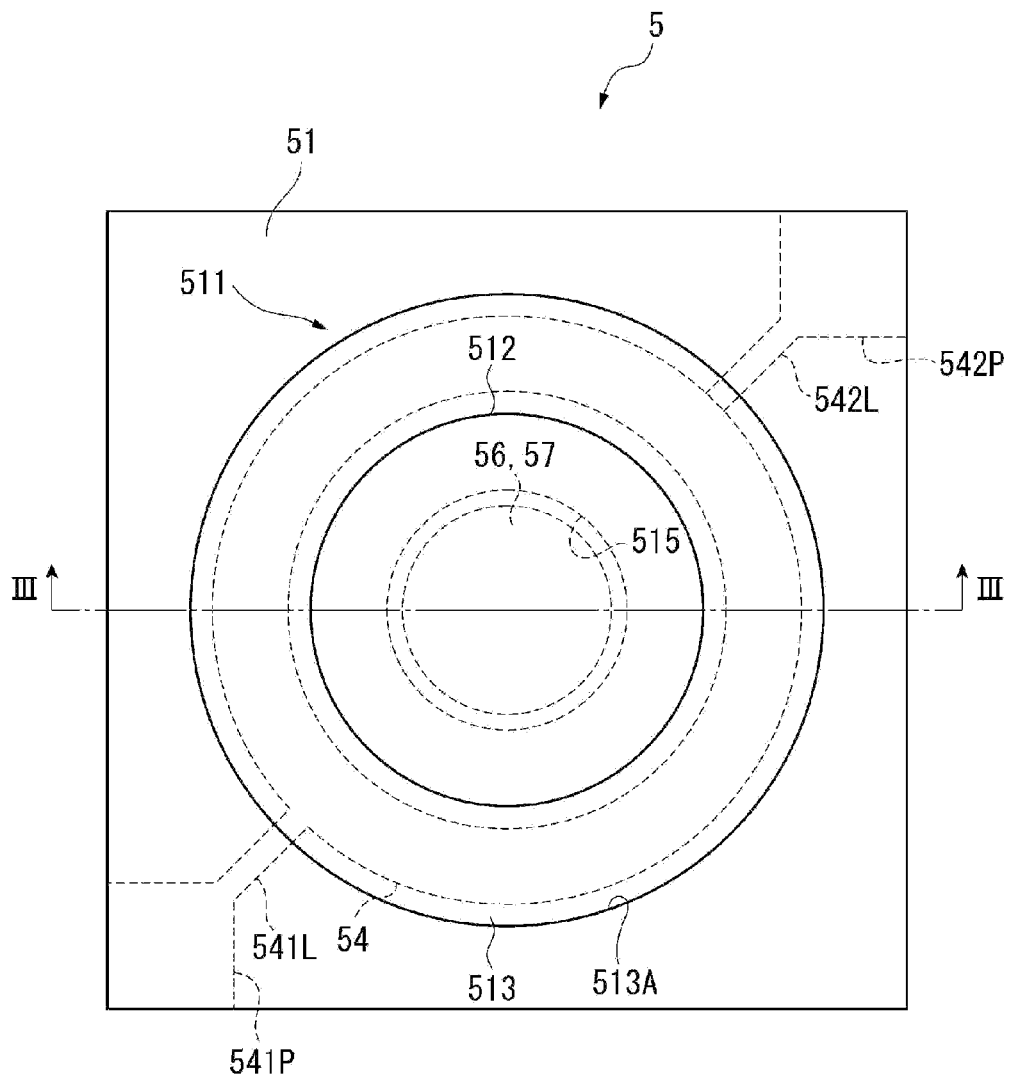
FIG. 2 is a plan view illustrating the general structure of an etalon according to the first embodiment.
Figure 3:
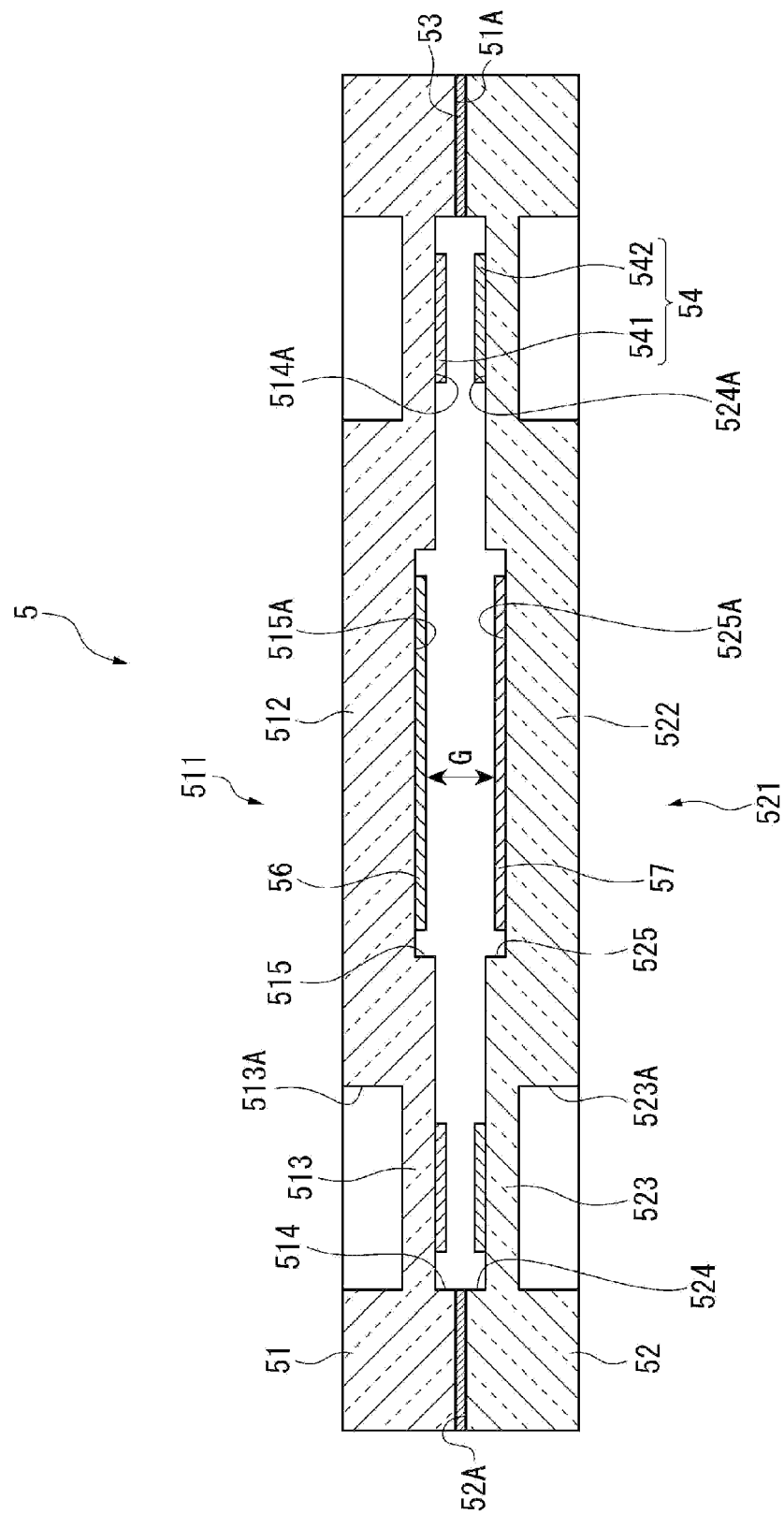
FIG. 3 is a cross-sectional view illustrating the general structure of the etalon according to the first embodiment.

FIG. 2 is a plan view illustrating the general structure of the etalon 5. FIG. 3 is a cross-sectional view of the etalon 5 taken along a line III-III in FIG. 2 as viewed in the direction of arrows. In FIG. 1, the test target light enters the etalon 5 from below as viewed in the figure. In FIG. 3, however, the test target light enters the etalon 5 from above as viewed in the figure.

As illustrated in FIG. 2, the etalon 5 is a plate-shaped optical component having a square shape in the plan view, and has sides each of which is 10 mm long, for example. As illustrated in FIG. 3, the etalon 5 has a first substrate 51 and a second substrate 52 disposed in this order as viewed from the entrance side of the test target light. These substrates 51 and 52 are bonded to each other with bonding layers 53 interposed therebetween by cold activation bonding or siloxane bonding which uses plasma polymeric film, for example, to be combined into one body. The first substrate 51 and the second substrate 52 have the same shape, and are disposed linearly symmetric with respect to the center axis corresponding to the bonding layers 53 in the cross-sectional view in FIG. 3. Each of the two substrates 51 and 52 is made of glass such as soda glass, crystal glass, quartz glass, lead glass, potassium glass, borosilicate glass, and non-alkali glass, or crystal, for example.

A first movable mirror 56 (first reflection film) and a second movable mirror 57 (second reflection film) are provided between the first substrate 51 and the second substrate 52. The first movable mirror 56 is fixed to a surface (first movable surface 515A described later) of the first substrate 51 on the side facing to the second substrate 52, while the second movable mirror 57 is fixed to a surface (second movable surface 525A described later) of the second substrate 52 on the side facing to the first substrate 51. The first and second movable mirrors 56 and 57 are disposed so as to be opposed to each other with a gap G left between the mirrors 56 and 57.

An electrostatic actuator 54 is further provided between the first substrate 51 and the second substrate 52 to control the length of the gap G between the movable mirrors 56 and 57.

3-1-1. Structure of First Substrate

The first substrate 51 is manufactured from a glass material which is 200 µm thick, for example, by etching. A first displacement unit 511 having a circular shape around the substrate center in the plan view as viewed in the thickness direction of the etalon 5 as illustrated in FIG. 2 (hereinafter referred to as "etalon plan view") is formed on the first substrate 51. The first displacement unit 511 is coaxial with a cylindrical first movable portion 512, and has a first linkage portion 513 which is annular in the etalon plan view and holds the first movable portion 512 in such a manner that the first movable portion 512 can shift in the thickness direction of the first substrate 51.

The first displacement unit 511 is defined by a groove formed on the plate-shaped glass material of the first substrate 51 by etching. More specifically, the first displacement unit 511 is defined by a first annular groove 513A having an annular shape and formed by etching on the light entrance surface of the first substrate 51 on the side not facing to the second substrate 52 as a groove along which the first linkage portion 513 is produced.

A first circular groove 514 which has a circular shape around the substrate center in the etalon plan view is formed by etching on the surface of the first displacement unit 511 on the side facing to the second substrate 52.

As explained above, the first and second substrates 51 and 52 are made of the same material and have the same shape. Thus, the first displacement unit 511 thus constructed is made of the same material and has the same shape as those of a second displacement unit 521 of the second substrate 52 (described later).

The first movable portion 512 has a larger thickness than that of the first linkage portion 513. The first movable portion 512 has a second circular groove 515 which has a circular shape around the substrate center in the etalon plan view. The second circular groove 515 is formed by etching on the bottom of the first circular groove 514 corresponding to the surface of the first movable portion 512 on the side facing to the second substrate 52. The second circular groove 515 is coaxial with the first circular groove 514, and has a smaller diameter than that of the first circular groove 514. The first movable mirror 56 is manufactured from a circular dielectric multilayer film made of $TiO_2$—$SiO_2$ family and having a diameter of about 3 mm, and is fixed to the first movable surface 515A corresponding to the bottom of the second circular groove 515.

According to this embodiment, the first movable mirror 56 is a mirror formed by the dielectric multilayer film of $TiO_2$—$SiO_2$ family. However, the first movable mirror 56 may be constituted by a monolayer mirror made of Ag alloy which covers the entire range of visible light as the wavelength range dividable by the mirror.

The first linkage portion 513 is a diaphragm surrounding the periphery of the first movable portion 512, and has a thickness of 50 μm, for example. A first electrode 541 having an annular shape in the etalon plan view is provided on the first linkage portion 513. The first electrode 541 is disposed on a first electrode fixing surface 514A corresponding to the bottom of the first circular groove 514 and opposed to the second substrate 52.

The material of the first electrode 541 is not specifically limited as long as it has conductivity and can generate an electrostatic attractive force between the first electrode 541 and a second electrode 542 (described later) of the second substrate 52 in response to voltage applied between the first electrode 541 and the second electrode 542. In this embodiment, the first electrode 541 is made of ITO (indium tin oxide), but may be made of other materials such as an Au/Cr metal laminated body.

A not-shown insulation film is provided on the upper surface of the first electrode 541 to prevent leakage caused by discharge between the first electrode 541 and the second electrode 542 or for other reasons. This insulation film is constituted by $SiO_2$ or TEOS (tetraethoxysilane), for example. It is particularly preferable that the insulation film is made of $SiO_2$ having optical characteristics similar to those of the glass substrate forming the first substrate 51. When the insulation film is constituted by $SiO_2$, reflection of light between the first substrate 51 and the insulation film or other problems do not occur. Thus, after formation of the first electrode 541 on the first substrate 51, the entire surface of the first substrate 51 on the side facing to the second substrate 52 can be coated with the insulation film made of $SiO_2$.

A first electrode extension portion 541L extends from a part of the outer circumference of the first electrode 541 toward the lower left of the etalon 5 in the etalon plan view shown in FIG. 2. A first electrode pad 541P provided at the end of the first electrode extension portion 541L is connected with the voltage control unit 6 (see FIG. 1).

During operation of the electrostatic actuator 54, voltage is applied to the first electrode pad 541P from the voltage control unit 6 (see FIG. 1).

The portion of the first substrate 51 where the first circular groove 514 is not formed corresponds to a bonding surface 51A of the first substrate 51. As illustrated in FIGS. 2 and 3, the bonding layer 53 is provided in the form of film on the bonding surface 51A. The bonding layer 53 is constituted by a plasma polymeric film chiefly including polyorganosiloxane, for example.

3-1-2. Structure of Second Substrate

As noted above, the second substrate 52 has a shape same as that of the first substrate 51. Thus, the structure of the second substrate 52 is herein explained only briefly.

The second substrate 52 is manufactured from a glass material which is 200 μm thick, for example, by etching similarly to the first substrate 51. A second displacement unit 521 having a circular shape in the etalon plan view is provided on the second substrate 52. As illustrated in FIG. 2, the second displacement unit 521 has a cylindrical second movable portion 522, and a second linkage portion 523 which holds the second movable portion 522 in such a manner that the second movable portion 522 can shift in the thickness direction of the second substrate 52.

According to this structure, the substrates 51 and 52 have the linkage portions 513 and 523, respectively. Thus, the movable portions 512 and 522 of the substrates 51 and 52 shift closer to each other when an electrostatic attractive force is generated between the first electrode 541 and the second electrode 542 (described later).

A first annular groove 523A having an annular shape and defining the second linkage portion 523 is formed by etching on the surface of the second displacement unit 521 on the side not facing to the first substrate 51.

In addition, a third circular groove 524 having a circular shape around the substrate center in the etalon plan view is formed by etching on the surface of the second displacement unit 521 on the side facing to the first substrate 51.

The second movable portion 522 has a fourth circular groove 525 which has a circular shape around the substrate center in the etalon plan view. The fourth circular groove 525 is formed by etching on the bottom of the third circular groove 524 corresponding to the surface of the second movable portion 522 on the side facing to the first substrate 51. The fourth circular groove 525 is coaxial with the third circular groove 524, and has a smaller diameter than that of the third circular groove 524.

The second movable surface 525A corresponding to the bottom of the fourth circular groove 525 and extending in parallel with the first movable surface 515A is a surface to which the second movable mirror 57 constructed the same as the first movable mirror 56 is fixed.

The second linkage portion 523 is disposed so as to be opposed to the first substrate 51. The second electrode 542 having an annular shape in the etalon plan view is provided on a second electrode fixing surface 524A corresponding to the bottom surface of the third circular groove 524. The second electrode 542 is positioned so as to be opposed to the first electrode 541 with a predetermined gap interposed therebetween, and is constructed the same as the first electrode 541. The electrostatic actuator 54 functioning as a gap varying unit in the appended claims is constituted by the second electrode 542 and the first electrode 541 described above.

A second electrode extension portion 542L extends from a part of the outer circumference of the second electrode 542 toward the upper right of the etalon 5 in the etalon plan view shown in FIG. 2. A second electrode pad 542P provided at the end of the second electrode extension portion 542L is connected with the voltage control unit 6 similarly to the first electrode pad 541P.

During operation of the electrostatic actuator 54, voltage is applied to the second electrode pad 542P from the voltage control unit 6 (see FIG. 1).

The portion of the second substrate 52 on the side facing to the first substrate 51 as the area where the second circular groove 524 is not formed corresponds to a bonding surface 52A of the second substrate 52. The bonding layer 53 chiefly including polyorganosiloxane is provided on the bonding surface 52A similarly to the bonding surface 51A of the first substrate 51.

According to the etalon 5 having the first substrate 51 and the second substrate 52 thus constructed, the first linkage portion 513 and the second linkage portion 523 are bended when predetermined voltage is applied to the electrostatic actuator 54. As a result, the first movable portion 512 and the second movable portion 522 shift relative to each other. The sum of the displacement amounts of the respective movable portions 512 and 522 determine the length of the gap G between the mirrors.

3-2. Structure of Voltage Control Unit

The voltage control unit 6 controls voltage applied to the first electrode 541 and the second electrode 542 of the electrostatic actuator 54 in response to a control signal received from the control device 4.

4. Structure of Control Device

The control device 4 controls the overall operation of the colorimeter 1. The control device 4 is constituted by a general-purpose personal computer, a mobile information terminal, a computer used exclusively for colorimetry, for example.

As illustrated in FIG. 1, the control device 4 includes a light source control unit 41, a colorimetric sensor control unit 42, and a colorimetric processing unit 43 (analyzing unit).

The light source control unit 41 is connected with the light source device 2. The light source control unit 41 outputs a predetermined control signal to the light source device 2 based on a setting input from a user, for example, and allows the light source device 2 to emit white light having predetermined brightness.

The colorimetric sensor control unit 42 is connected with the colorimetric sensor 3. The colorimetric sensor control unit 42 determines the wavelength of light to be received by the colorimetric sensor 3 based on a setting input from the user, for example, and outputs a control signal for allowing the colorimetric sensor 3 to detect the amount of light having the determined wavelength. Based on the control signal, the voltage control unit 6 of the colorimetric sensor 3 determines voltage to be applied to the electrostatic actuator 54 such that only the light having the desired wavelength selected by the user can be transmitted at the determined voltage.

The colorimetric processing unit 43 varies the gap between the mirrors of the etalon 5 and changes the wavelength of light which can pass through the etalon 5 by controlling the colorimetric sensor control unit 42. The colorimetric processing unit 43 acquires the information about the amount of light having passed through the etalon 5 based on the light reception signal received from the light receiving element 31. The colorimetric processing unit 43 calculates the chromaticity of the light reflected by the test target A and having the desired wavelength based on the amount of the light obtained in this manner.

5. Etalon Manufacturing Method

A method of manufacturing the etalon 5 is now explained with reference to FIG. 4A through 4E.

For manufacturing the etalon 5, the first substrate 51 and the second substrate 52 are separately produced, and affixed to each other after completion of each of the substrates 51 and 52. Since the steps for manufacturing each of the substrates 51 and 52 are the same, only the manufacturing steps of the first substrate 51 are herein described.

Figure 4A:
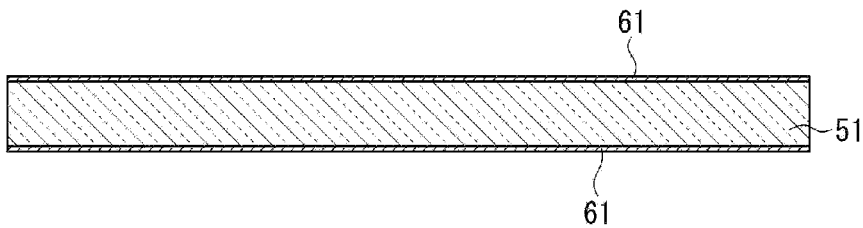
FIGS. 4A through 4E show manufacturing steps of each substrate of the etalon according to the first embodiment.

A quartz glass substrate which is 200 μm thick is prepared as a material of the first substrate 51. Both surfaces of the glass substrate are precision-ground until a surface roughness Ra of the glass substrate becomes 1 nm or smaller. As illustrated in FIG. 4A, a resist 61 is applied to the upper surface and the lower surface of the first substrate 51.

Figure 4B:
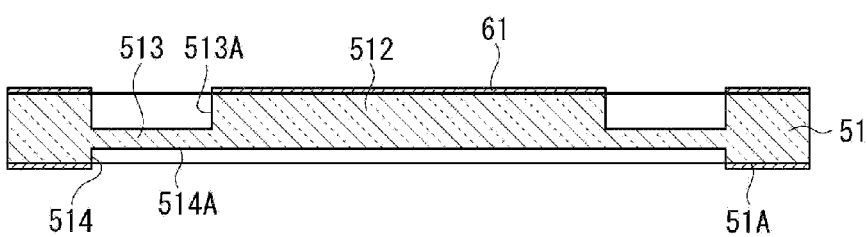

The resist 61 applied to the surfaces is exposed and developed by photolithography. The areas where the first linkage portion 513 (first annular groove 513A) and the first circular groove 514 (first electrode fixing surface 514A) are formed are patterned. The first substrate 51 is soaked in etchant such as HF, and wet-etched until the upper surface and the lower surface of the first substrate 51 have desired depths as illustrated in FIG. 4B. The relationship between the depth of the etching and the time of the soakage of the substrate in the etchant is determined beforehand. Thus, the first substrate 51 is soaked in the etchant for a predetermined time to form the first annular groove 513A and the first circular groove 514.

Figure 4C:
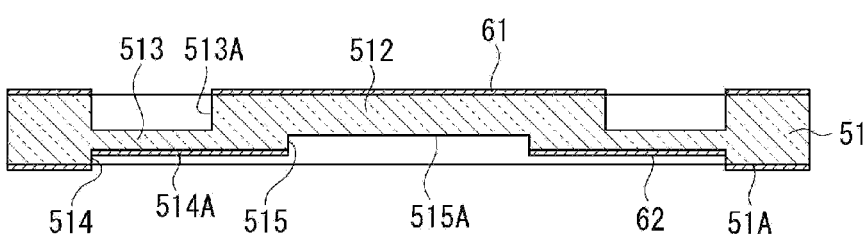

Another resist 62 is applied to the bottom of the first circular groove 514. The applied resist 62 is exposed and developed by photolithography. The area where the second circular groove 515 (first movable surface 515A) is formed is patterned. The lower surface of the first substrate 51 is wet-etched to a desired depth to form the second circular groove 515 as illustrated in FIG. 4C.

The resists 61 and 62 are removed to produce the first linkage portion 513 which is 50 μm thick, the first movable portion 512, the first electrode fixing surface 514A, and the first movable surface 515A.

Figure 4D:
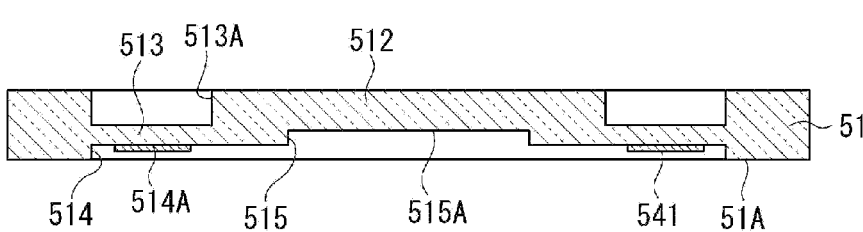

A resist (lift off pattern) is applied to the area of the lower surface of the first substrate 51 other than the position of the first electrode 541. An ITO layer is formed by sputtering, and the resist is removed. As a result, the first electrode 541 is produced on the first electrode fixing surface 514A as illustrated in FIG. 4D.

Figure 4E:
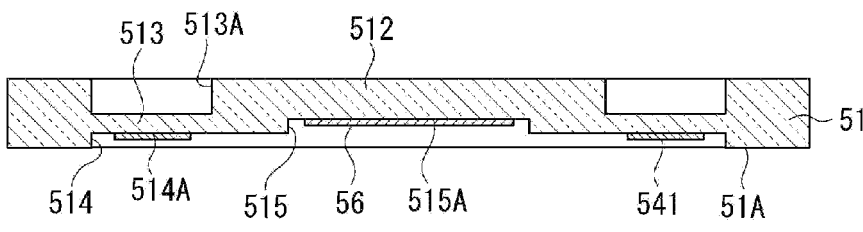

A resist (lift off pattern) is applied to the area of the first movable surface 515A other than the position of the first movable mirror 56. A thin film of $TiO_2$—$SiO_2$ family is formed by sputtering, and the resist is removed. As a result, the circular first movable mirror 56 having a diameter of about 3 mm is produced on the first movable surface 515A as illustrated in FIG. 4E.

Manufacture of the first substrate 51 is now completed.

The second substrate 52 is produced by the same manufacturing steps as those of the first substrate 51, and thus is manufactured simultaneously with the manufacture of the first substrate 51. The second substrate 52 may be produced by repeating the manufacturing steps of the first substrate 51.

The first substrate 51 and the second substrate 52 thus produced are bonded to each other. More specifically, $O_2$ plasma processing or UV processing is performed for giving activation energy to each of the plasma polymeric films constituting the bonding layers 53 provided on the bonding surfaces 51A and 52A of the substrates 51 and 52. The $O_2$ plasma processing is executed for 30 seconds under the condition of the $O_2$ flow amount of 30 cc/min., the pressure of 27 Pa, and the RF power of 200 W. The UV processing is executed for 3 minutes by using excimer UV (wavelength: 172 nm) as the UV light source. After the activation energy is given to the plasma polymeric films, the two substrates 51 and 52 are aligned with each other. Then, the bonding surfaces 51A and 52A are overlapped with each other via the bonding layers 53 interposed therebetween, and a load is applied to the overlapped bonding surfaces 51A and 52A to bond the substrates 51 and 52.

The manufacture of the etalon 5 is now finished.

6. Advantages of First Embodiment

According to the etalon 5 in the first embodiment, the following advantages can be offered.

(1) The first substrate 51 and the second substrate 52 have the movable portions 512 and 522 and the linkage portions 513 and 523. When voltage is applied to the electrodes 541 and 542, the linkage portions 513 and 523 are bended nearer to each other, which shifts the movable portions 512 and 522 closer to each other accordingly. In this case, the sum of the displacement amounts of the first movable portion 512 and the second movable portion 522 is only required to be equivalent to the displacement amount of a movable portion in the structure of the related art described above which has the movable portion only on one of the substrates. That is, each of the displacement amounts of the movable portions 512 and 522 is only required to be equivalent to the half of the displacement amount in the related art. Thus, the variations in the gap caused by external factors can be reduced without decreasing the thickness and the area of each of the linkage portions 513 and 523. Accordingly, the gap can be set at a desired length corresponding to the applied voltage with high accuracy.

(2) The respective substrates 51 and 52 are made of the same material and have the same shape. Thus, the bending volumes of the first linkage portion 513 and the second linkage portion 523 produced when external factors are given thereto become equivalent, which equalizes the displacement amounts of the first movable portion 512 and the second movable portion 522. In this case, the respective movable portions 512 and 522 of the substrates 51 and 52 shift by the same shift amount in the same direction when the movable portions 512 and 522 receive external factors such as vibrations described above. Accordingly, the variations in the gap can be further reduced. Moreover, the substrates 51 and 52 can be produced by the same manufacturing steps, which simplifies the process of manufacture.

(3) The substrates 51 and 52 have the first movable portion 512 and the second movable portion 522. In this case, the desired length of the gap is determined by the sum of the displacement amounts of the first movable portion 512 and the second movable portion 522. Thus, only the half of the displacement amount of the movable portion in the related-art structure which has the movable portion only on one of the substrates is required for each of the movable portions 512 and 522. Accordingly, the voltage required to be applied to the electrostatic actuator 54 for shifting the movable portions 512 and 522 can be decreased, which contributes to power saving.

For achieving power saving, reduction of the thickness of the linkage portion is expected to be an effective solution in case of the structure which has the movable portion only on one of the substrates, for example. In this case, however, variations in the gap may be caused by the external factors described above. According to this embodiment, power saving can be achieved without decreasing the thickness and the like of the linkage portion.

Second Embodiment

Figure 5:
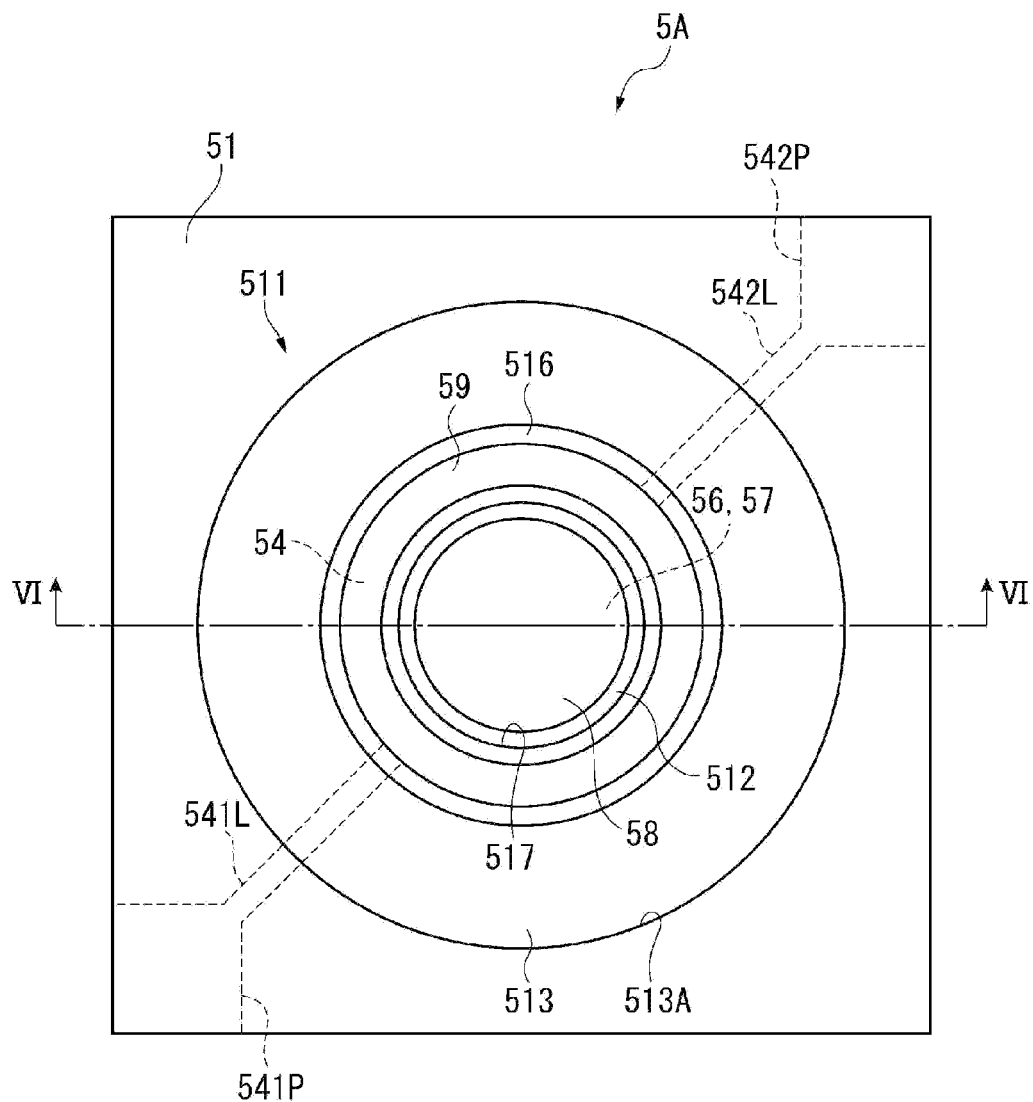
FIG. 5 is a plan view illustrating the general structure of an etalon according to a second embodiment of the invention.

A second embodiment according to the invention is hereinafter described with reference to FIGS. 5 and 6.

An etalon 5A in this embodiment is constructed similarly to the etalon 5 in the first embodiment. However, the etalon 5A is different from the etalon 5 in that the linkage portions 513 and 523 of the substrates 51 and 52 are disposed at the centers of the substrates 51 and 52 in the cross-sectional view in FIG. 6, and that an anti-reflection film 58 and a dummy electrode 59 are provided on each of the substrates 51 and 52.

In this embodiment, the components and parts corresponding to the same components and parts in the first embodiment are given the same reference numbers, and the same explanation is not repeated.

The etalon 5A includes the first substrate 51 and the second substrate having the same shape similarly to the first embodiment. Thus, only the structure of the first substrate 51 is discussed herein, and the explanation of the structure of the second substrate 52 is not repeated.

The first displacement unit 511 of the first substrate 51 includes the cylindrical first movable portion 512 to which the first movable mirror 56 is fixed, the first linkage portion 513 having an annular shape in the etalon plan view, and the first electrode fixing portion 516 having an annular shape in the etalon plan view and disposed between the first movable portion 512 and the first linkage portion 513 as a surface to which the first electrode 541 is fixed.

The first movable portion 512 has a thickness larger than the thickness of the first linkage portion 513 and smaller than the thickness of the first electrode fixing portion 516. The first movable portion 512 formed at the center of the substrate in the substrate thickness direction in the cross-sectional view in FIG. 6 is defined by circular grooves 517 having the same shape and the same groove depth and formed by etching on the upper surface and the lower surface of the first substrate 51. The first movable mirror 56 is provided on the bottom of the circular groove 517 on the side facing to the second substrate 52, while the anti-reflection film 58 (second bend prevention film) made of the same material as that of the first movable mirror 56 is provided on the bottom of the circular groove 517 on the side corresponding to the light entrance surface of the first substrate 51.

The anti-reflection film 58 having a function of preventing reflection of received light and increasing transmission light is disposed at the position overlapping with the first movable mirror 56 in the etalon plan view. The anti-reflection film 58 reduces a bend of the first substrate 51 produced when the stress acting in the surface direction of the first movable mirror 56 varies due to the change of the environment temperature. More specifically, when the environment temperature changes, the coefficient of linear expansion and the like of the first movable mirror 56 vary. In this case, the internal stress of the first movable mirror 56 varies accordingly and produces a bend of the first substrate 51. According to this structure, the anti-reflection film 58 made of the same material as that of the first movable mirror 56 and formed such that the internal stresses of the anti-reflection film 58 and the first movable mirror 56 can be equivalent is equipped. In this case, the coefficient of linear expansion and the like of the anti-reflection film 58 similarly vary when the environment temperature changes, in which condition the internal stress of the anti-reflection film 58 varies accordingly. Thus, when the anti-reflection film 58 is formed such that the internal stress of the anti-reflection film 58 acts in the direction opposite to the direction in which the internal stress of the first movable mirror 56 acts, the bending moment produced by the internal stress of the first movable mirror 56 and acting on the first substrate 51 can be balanced against the bending moment produced by the internal stress of the anti-reflection film 58 and acting on the first substrate 51. By this mechanism, reduction of the bend of the first substrate 51 is realized.

Figure 6:
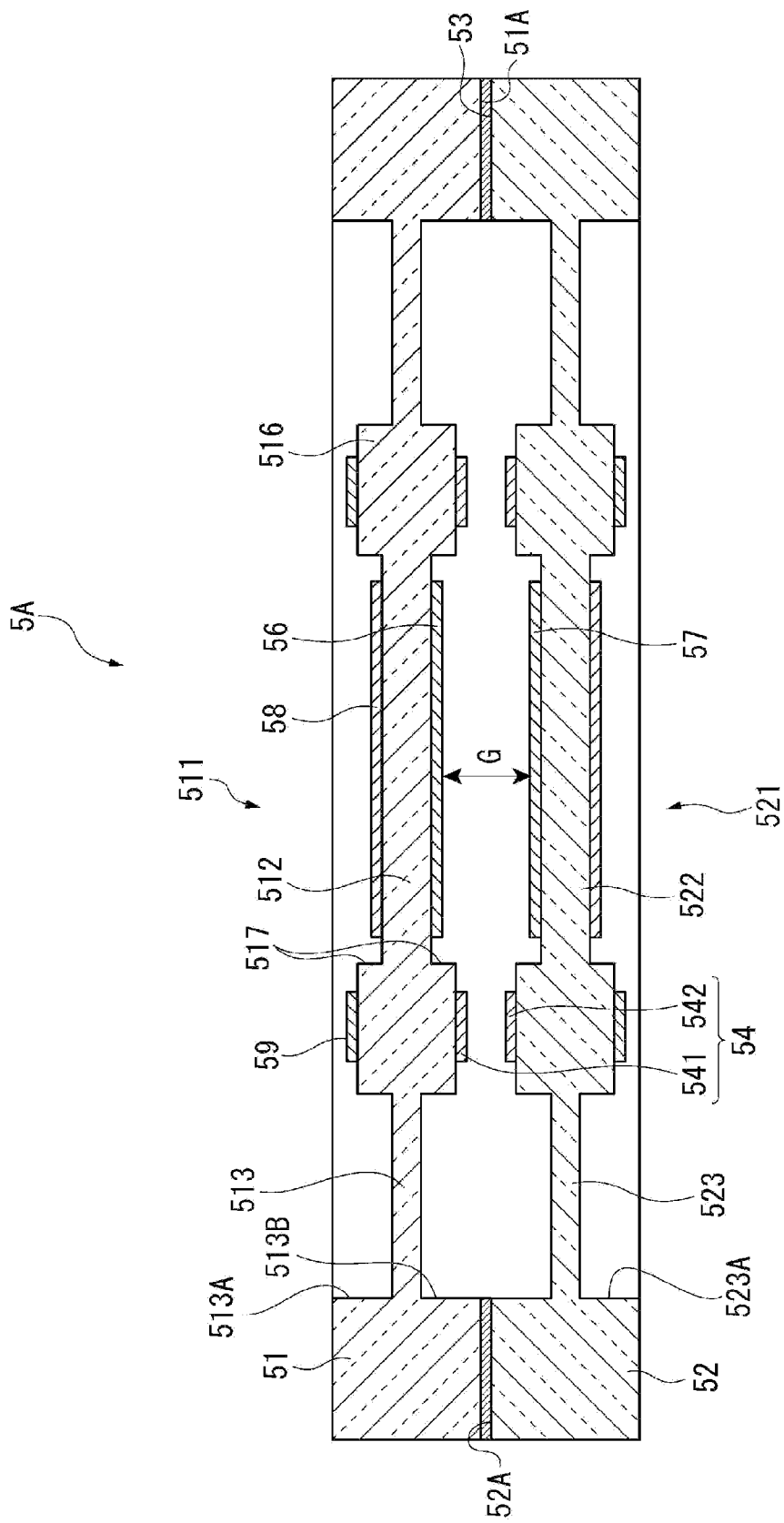
FIG. 6 is a cross-sectional view illustrating the general structure of the etalon according to the second embodiment.

The first linkage portion 513 is disposed at the center in the thickness direction of the first substrate 51 in the cross-sectional view in FIG. 6. In this structure, a second annular groove 513B having an annular shape and having the same shape and groove depth as those of the first annular groove 513A is formed on the surface of the first substrate 51 on the side facing to the second substrate 52 as well as the first annular groove 513A provided on the light entrance surface of the first substrate 51.

The upper and lower surfaces of the first substrate 51 are etched to produce the first electrode fixing portion 516 having a predetermined thickness and defined by the circular grooves 517 and the annular grooves 513A and 513B. The first electrode fixing portion 516 has a thickness larger than the thickness of the first movable portion 512 and than the thickness of the first linkage portion 513, and is disposed at the center in the substrate thickness direction in the cross-sectional view in FIG. 6. Therefore, the gap length between the first electrode 541 and the second electrode 542 is smaller than the gap length between the first movable mirror 56 and the second movable mirror 57 in this embodiment similarly to the first embodiment.

The ring-shaped first electrode 541 is provided on the surface of the first electrode fixing portion 516 on the side facing to the second substrate 52, and the dummy electrode 59 (first bend prevention film) made of the same material and having the same shape as those of the first electrode 541 is provided on the light entrance surface of the first electrode fixing portion 516. That is, the dummy electrode 59 is overlapped on the first electrode 541 in the etalon plan view.

The dummy electrode 59 functions similarly to the anti-reflection film 58, and reduces the bend of the first substrate 51 produced by variations in the coefficient of linear expansion and the like of the first electrode 541 due to the change of the environment temperature. The specific operation of the dummy electrode 59 is similar to that of the anti-reflection film 58, and therefore is not particularly explained herein.

As obvious from the above description, the first movable portion 512, the first linkage portion 513, and the first electrode fixing portion 516 of the first substrate 51 in this embodiment are positioned at the center in the substrate thickness direction. The first displacement unit 511 has a linearly symmetric structure with respect to a symmetric axis corresponding to a line which passes through the center line of the first linkage portion 513 in the substrate thickness direction and extending in parallel with the surfaces of the movable mirrors 56 and 57. The second displacement unit 521 of the second substrate 52 is shaped the same as the first displacement unit 511, and thus has a linearly symmetric structure with respect to a symmetric axis corresponding to a line which passes through the center of the second linkage portion 523 in the thickness direction of the second substrate 52 and extending in parallel with the surfaces of the movable mirrors 56 and 57.

The method of manufacturing the etalon 5A is now explained with reference to FIGS. 7A through 7F. Similarly to the first embodiment, only the manufacturing steps of the first substrate 51 are herein described, and the explanation of the manufacturing steps of the second substrate 52 is not repeated.

Figure 7:
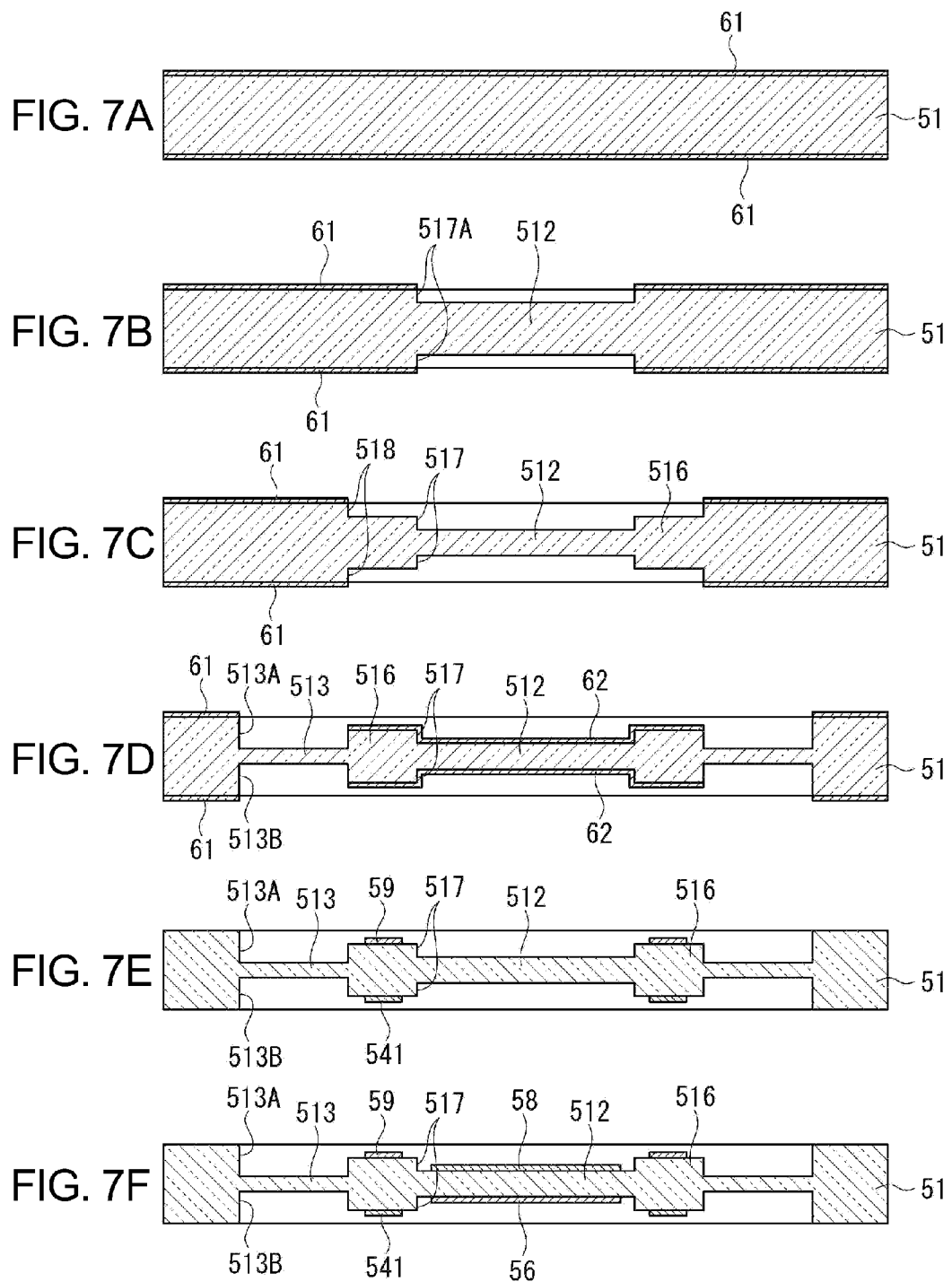
FIGS. 7A through 7F show manufacturing steps of each substrate of the etalon according to the second embodiment.

A quartz glass substrate is prepared as a material of the first substrate 51. Both surfaces of the glass substrate are precision-ground until the surface roughness Ra of the glass substrate becomes 1 nm or smaller. As illustrated in FIG. 7A, the resist 61 is applied to the upper surface and the lower surface of the first substrate 51.

The resist 61 applied to the surfaces is exposed and developed by photolithography. The area where the first movable portion 512 is formed is patterned. The first substrate 51 is soaked in etchant such as HF, and the upper surface and the lower surface of the first substrate 51 are wet-etched as illustrated in FIG. 7B. As a result, a circular groove 517A having a depth smaller than the depth of the circular groove 517 is formed on each of the upper surface and the lower surface of the first substrate 51.

The applied resist 61 is further exposed and developed by photolithography. The area where the first electrode fixing portion 516 is formed is patterned. The circular grooves 517A formed on the upper and the lower surfaces of the first substrate 51 are wet-etched to a desired depth to produce the circular grooves 517 having the desired depth and defining the first movable portion 512. Moreover, the circular grooves 518 each of which has a diameter larger than that of the circular groove 517 and is coaxial with the circular groove 517 are formed as grooves defining the first electrode fixing portion 516.

The applied resist 61 is further exposed and developed by photolithography. The area where the first linkage portion 513 (annular grooves 513A and 513B) is formed is patterned. As illustrated in FIG. 7D, the resist 62 is also applied to the first movable portion 512 and the first electrode fixing portion 516. The upper surface and the lower surface of the first substrate 51 are wet-etched to produce the annular grooves 513A and 513B having the desired depths and defining the first linkage portion 513 which is 50 μm thick as illustrated in FIG. 7D.

The resists 61 and 62 are removed to obtain the first linkage portion 513, the first electrode fixing portion 516, and the first movable portion 512.

A resist (lift off pattern) is applied to the upper surface of the first substrate 51 in the area other than the position of the dummy electrode 59, and to the lower surface of the first substrate 51 in the area other than the position of the first electrode 541. An ITO layer is formed by sputtering, and the resist is removed. By this step, the first electrode 541 and the dummy electrode 59 are formed on the first electrode fixing portion 516 as illustrated in FIG. 7E.

A resist (lift off pattern) is further applied to the upper surface of the first movable portion 512 in the area other than the position of the anti-reflection film 58, and to the lower surface of the first movable portion 512 in the area other than the position of the first movable mirror 56. Then, a thin film made of $TiO_2$—$SiO_2$ family is formed by sputtering, and the resist is removed. By this step, the first movable mirror 56 and the anti-reflection film 58 each of which has a circular shape and a diameter of about 3 mm are produced on the first movable portion 512.

The manufacture of the first substrate 51 is now completed.

The second substrate 52 is produced by the manufacturing steps same as those of the first substrate 51 described above.

The respective substrates 51 and 52 are bonded to each other in a manner similar to that of the first embodiment to obtain the etalon 5A.

According to the etalon 5A in the second embodiment, the following advantages can be offered as well as the advantages (1) through (3) provided in the first embodiment.

According to this embodiment, the respective substrates 51 and 52 are linearly symmetric with respect to the symmetric axis corresponding to the line which passes through the center of the linkage portions 513 and 523 in the substrate thickness direction and extends in parallel with the surfaces of the movable mirrors 56 and 57 in the cross-sectional view.

When external factors such as vibrations are given to the displacement units 511 and 521, these units 511 and 521 vibrate in the surface directions of the substrates and receive forces in the surface directions. When the displacement units 511 and 521 are not linearly symmetric, the forces acting on the respective units 511 and 521 become unbalanced, and change the gap between the mirrors provided on the movable portions 512 and 522. According to this embodiment, however, the respective displacement units 511 and 521 are linearly symmetric, and the forces acting on the displacement units 511 and 521 can be well-balanced in the surface directions. Thus, even when the displacement units 511 and 521 vibrate in the surface directions of the substrates 51 and 52, variations in the gap can be reduced.

Accordingly, the change of the gap length can be reduced in this embodiment even when the substrates 51 and 52 vibrate in the thickness directions or the surface directions due to external factors given to the substrates 51 and 52.

When the environment temperature changes, the internal stresses of the movable mirrors 56 and 57 and of the electrodes 541 and 542 formed on the substrates 51 and 52 vary as explained above. In this case, the substrates 51 and 52 may be bended in accordance with the variations in the internal stresses. According to this embodiment, the dummy electrode 59 made of the same material and having the same shape as those of the electrodes 541 and 542 is provided on each of the surfaces of the substrates 51 and 52 on the side opposite to the surface where the electrodes 541 and 542 are formed, and the anti-reflection film 58 made of the same material and having the same shape as those of the movable mirrors 56 and 57 is provided on each of the surfaces of the substrates 51 and 52 on the side opposite to the surface where the movable mirrors 56 and 57 are formed. According to this structure, the bending moment caused by the internal stresses of the movable mirrors 56 and 57 and the electrodes 541 and 542 and acting on the substrates 51 and 52 is balanced with the bending moment caused by the internal stresses of the dummy electrodes 59 and the anti-reflection films 58 and acting on the substrates 51 and 52. Thus, bends of the substrates 51 and 52 can be reduced. In addition, the substrates 51 and 52 have symmetric structure, which further reduces the bends of the substrates 51 and 52 and maintains parallelism between the first movable mirror 56 and the second movable mirror 57. Accordingly, the resolution of the etalon 5A further increases.

Modifications of Embodiments

The invention is not limited to the embodiments described herein but includes modifications, improvements and the like of the embodiments without departing from the scope of the invention. For example, the following changes may be made.

Figure 8:
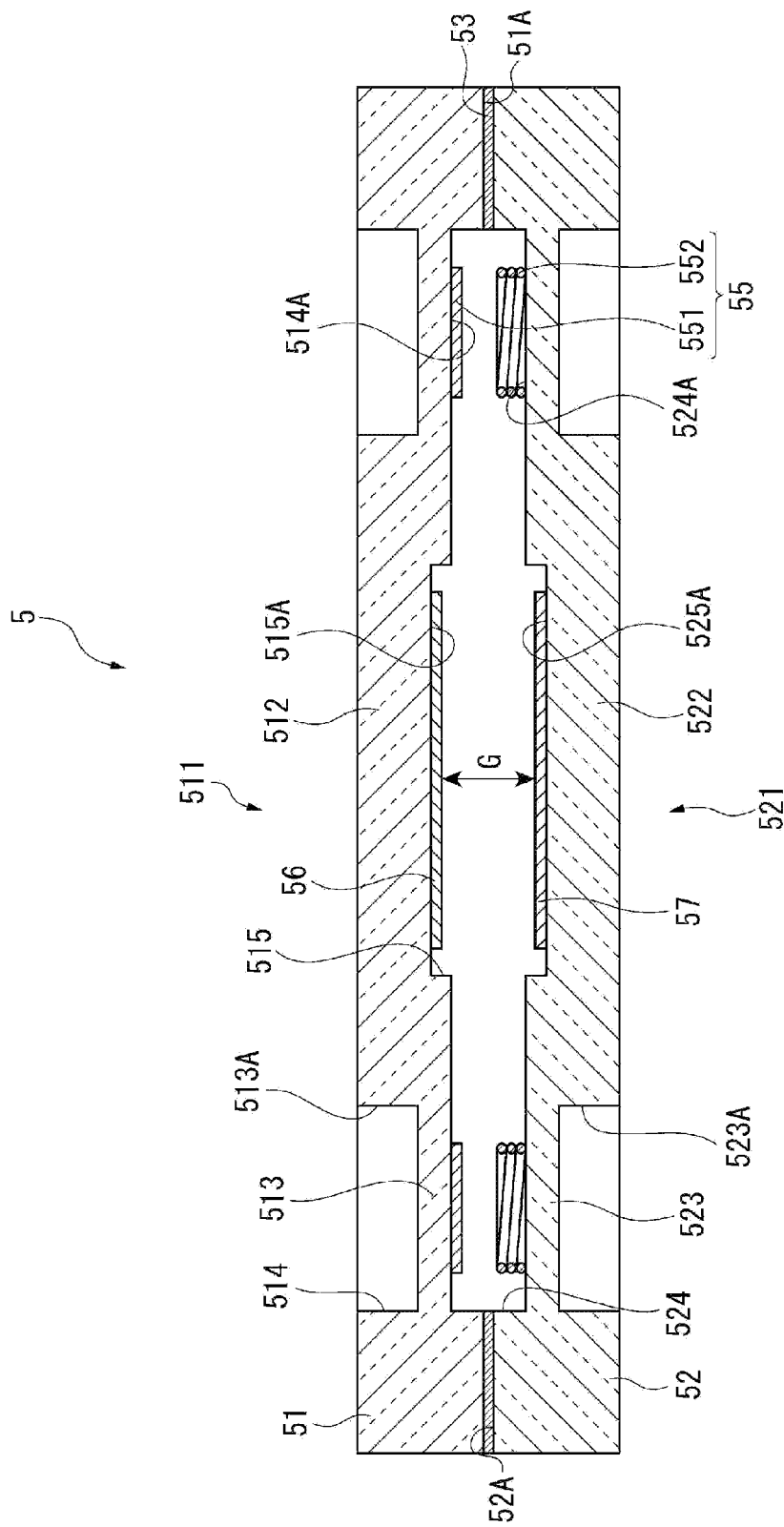
FIG. 8 is a cross-sectional view of an etalon according to a modified example of the invention.

According to the respective embodiments, the gap varying unit in the appended claims is constituted by the electrostatic actuator 54. However, the gap varying unit may be an electromagnetic actuator 55 shown in FIG. 8, for example. The electromagnetic actuator 55 has an electromagnetic coil 551 to which current is supplied, and a permanent magnet 552 which shifts toward the electromagnetic coil 551 by an electromagnetic force. The electromagnetic coil 551 is disposed on the first electrode fixing surface 514A of the first substrate 51. The permanent magnet 552 is disposed on the second electrode fixing surface 524A of the second substrate 52. The electromagnetic coil 551 and the permanent magnet 552 are positioned so as to be opposed to each other. When current flows in the electromagnetic coil 551, the electromagnetic coil 551 and the permanent magnet 552 shift closer to each other by the magnetic flux given from the permanent magnet 551 and the electromagnetic force produced by the interaction between the magnetic flux and the current. Accordingly, the displacement units 511 and 522 can shift relative to each other.

Figure 9:
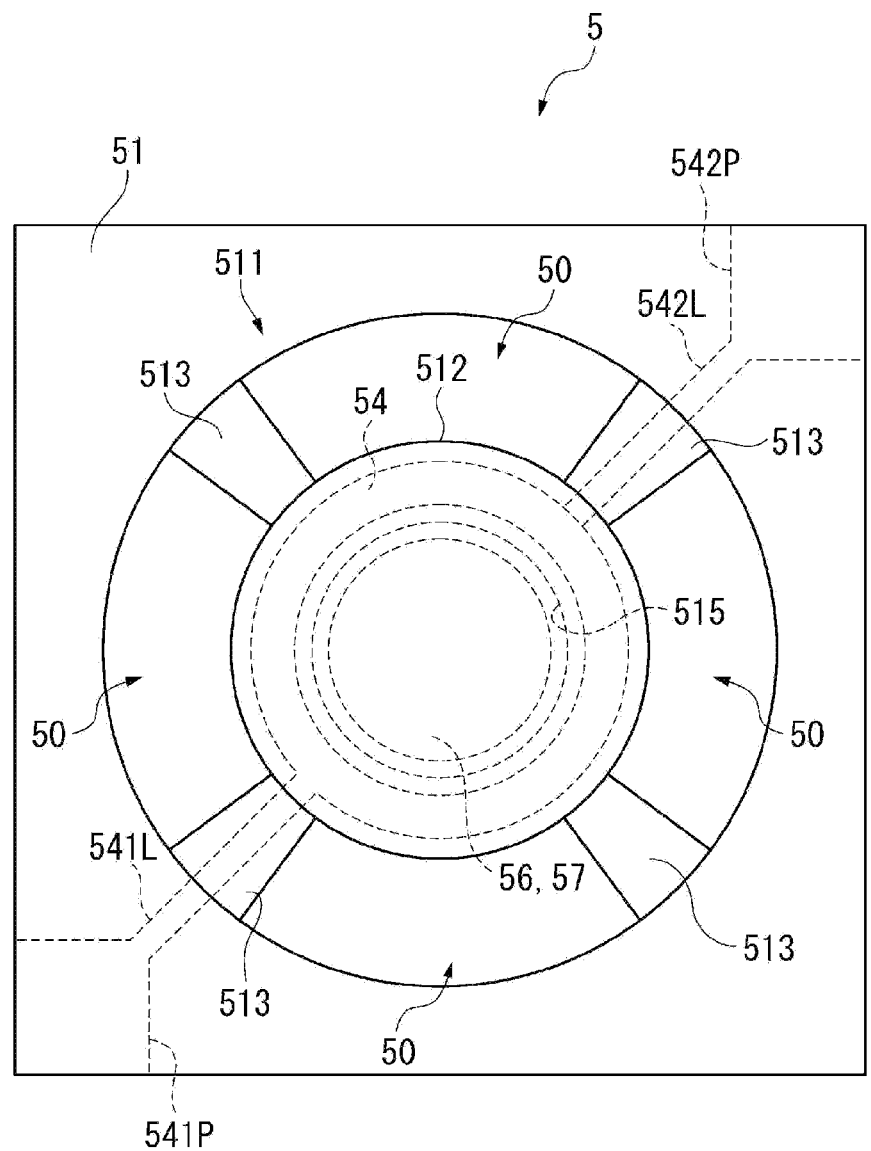
FIG. 9 is a plan view of an etalon according to another modified example of the invention.

According to the respective embodiments, the linkage portions 513 and 523 are formed by annular diaphragms. However, the first linkage portion 513 may be constituted by beams which extend from the center of the first movable portion 512 in the etalon plan view as the symmetry center toward positions of point symmetry. More specifically, as illustrated in the plan view in FIG. 9 showing a modification of the etalon 5 in the first embodiment, the first linkage portion 513 is defined by four through holes 50 provided outside the first movable portion 512 and penetrating through the first movable portion 512 in the substrate thickness direction. In this structure, the ring-shaped electrostatic actuator 54 is provided on the surface of the first movable portion 512 on the side facing to the second substrate 52 at a position outside the first movable mirror 56.

Figure 10:
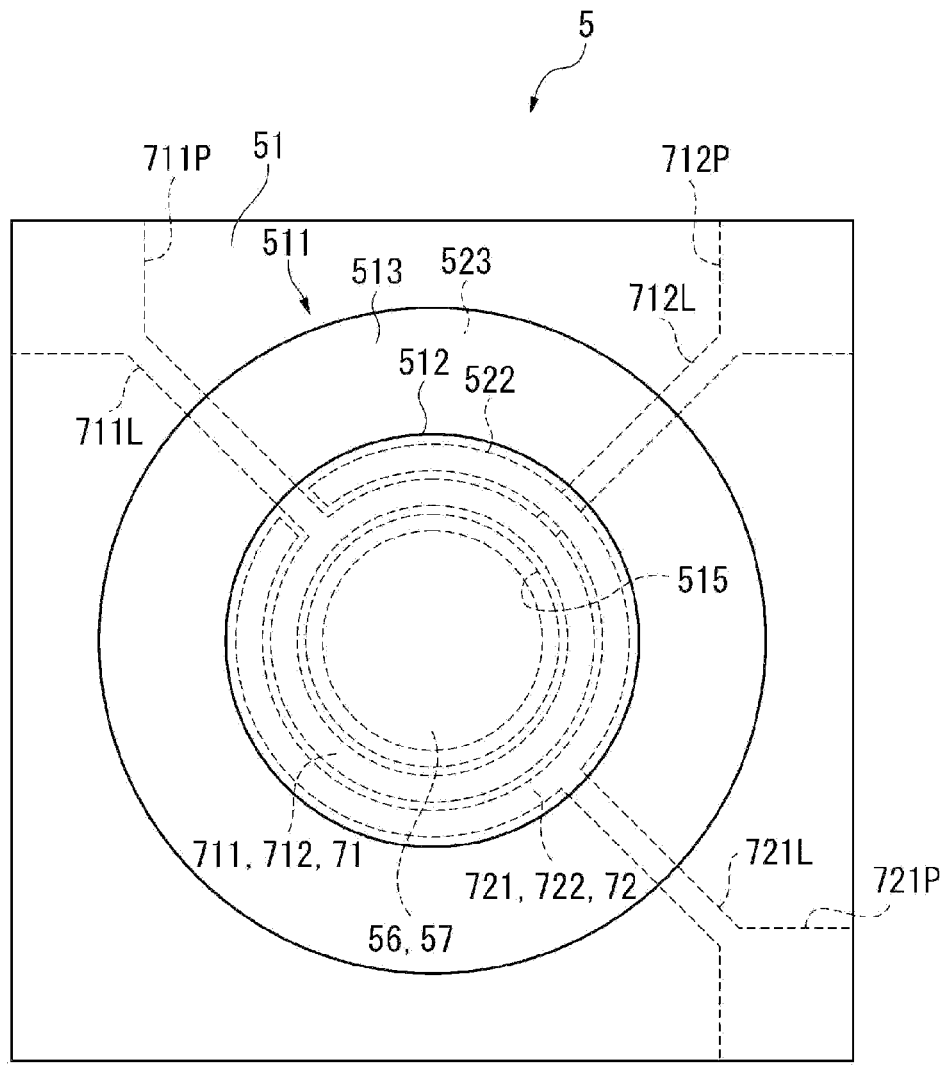
FIG. 10 is a plan view of an etalon according to a further modified example of the invention.

According to the respective embodiments, the electrostatic actuator 54 has a single-ring shape. However, the electrostatic actuator 54 may have a double-ring shape as illustrated in FIG. 10. More specifically, as illustrated in the plan view in FIG. 10 showing a modification of the etalon 5 in the first embodiment, the etalon 5 has a first electrostatic actuator 71 (gap varying unit) having a ring shape and disposed outside the first movable mirror 56, and a second electrostatic actuator 72 (gap varying unit) having a C-ring shape and disposed outside the first electrostatic actuator 71. These first and second electrostatic actuators 71 and 72 are provided on each surface of the first movable portion 512 and the second movable portion 522 on the side facing to each other.

An inside first electrode extension portion 711L extends from a part of the outer circumference of an inside first electrode 711 (electrode provided on the first substrate 51) of the first electrostatic actuator 71 toward the upper left of the etalon 5 in the etalon plan view. In addition, an inside first electrode pad 711P is provided at the end of the inside first electrode extension portion 711L and connected with the voltage control unit 6 (see FIG. 1). According to this structure, voltage is applied to the inside first electrode pad 711P from the voltage control unit 6 (see FIG. 1) during operation of the first electrostatic actuator 71.

On the other hand, an outside first electrode extension portion 721L extends from a part of the outer circumference of an outside first electrode 721 (electrode provided on the first substrate 51) of the second electrostatic actuator 72 toward the lower right of the etalon 5 in the etalon plan view. In addition, an outside first electrode pad 721P is provided at the end of the outside first electrode extension portion 721L and connected with the voltage control unit 6 (see FIG. 1). According to this structure, voltage is applied to the outside first electrode pad 721P from the voltage control unit 6 (see FIG. 1) during operation of the second electrostatic actuator 72.

Second electrodes 712 and 722 (electrodes provided on the second substrate 52) of the electrostatic actuators 71 and 72 are disposed so as to be opposed to the first electrodes 711 and 721. A second electrode extension portion 712L extends from a part of the outer circumference of the inside second electrode 712 toward the upper right of the etalon 5 in the etalon plan view in such a manner as to cross over the outside second electrode 722. A second electrode pad 712P is provided at the end of the second electrode extension portion 712L and connected with the voltage control unit 6 (see FIG. 1). According to this structure, voltage is applied to the second electrode pad 712P from the voltage control unit 6 (see FIG. 1) during operation of the electrostatic actuators 71 and 72.

In this modification, applied voltage can be controlled for each of the electrostatic actuators 71 and 72 by using the voltage control unit 6. Thus, more accurate gap setting can be realized.

According to this modification, the electrostatic actuators 71 and 72 are disposed on the surfaces of the first movable portion 512 and the second movable portion 522 on the sides facing to each other. However, the electrostatic actuators 71 and 72 may be positioned on the surfaces of the first linkage portion 513 and the second linkage portion 523 on the sides facing to each other.

While the modification of the first embodiment is shown in FIG. 10 as an example, the modification may be incorporated in the etalon 5A in the second embodiment. In this case, the dummy electrode has a double-ring shape.

Figure 11:
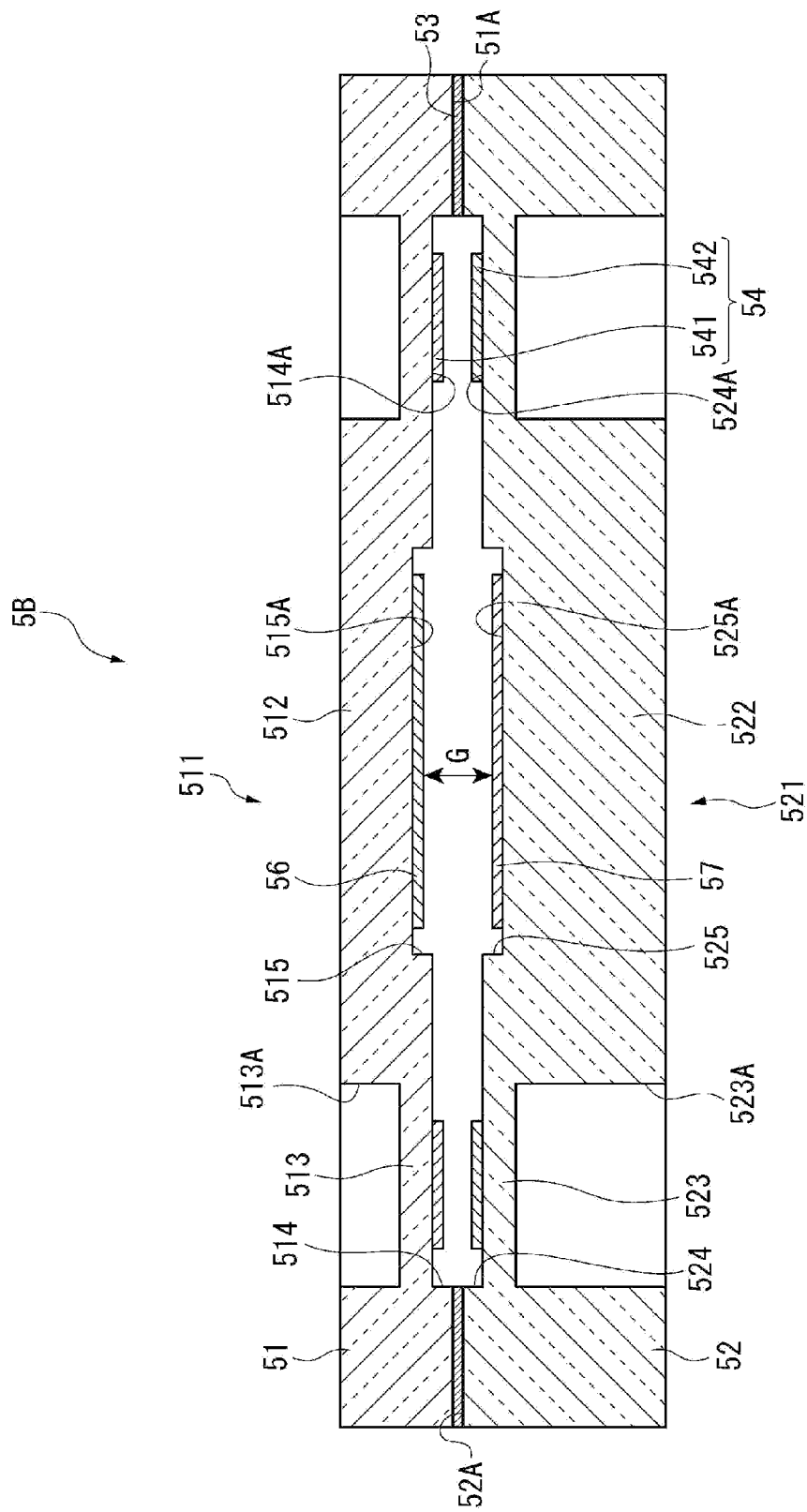
FIG. 11 is a cross-sectional view of an etalon according to a still further modified example of the invention.

According to the respective embodiments, the substrates 51 and 52 have the same shape. However, the thickness of the first substrate 51 may be made smaller than the thickness of the second substrate 52 as in the case of an etalon 5B show in FIG. 11. Alternatively, the thickness of the first substrate 51 may be made larger than the thickness of the second substrate 52.

According to the first embodiment, the first circular groove 514 is formed on the first substrate 51, and the third circular groove 524 is formed on the second substrate 52, so as to secure the gap G between the mirrors and the gap between the electrodes. However, the first circular groove 514 and the third circular groove 524 may be eliminated. In this case, each thickness of the bonding layers 53 between the substrates 51 and 52 may be increased to secure the gap G between the mirrors and the gap between the electrodes. In this modification, the necessity of performing the steps for forming the first circular groove 514 and the third circular groove 524 can be eliminated, which simplifies the manufacture process.

According to the second embodiment, the linkage portions 513 and 523 are disposed at the centers in the thickness directions of the substrates 51 and 52. However, the linkage portions 513 and 523 are not required to be positioned at the centers.

According to the respective embodiments, the electrodes 541 and 542 are produced prior to the formation of the movable mirrors 56 and 57 in the manufacture processes of the substrates 51 and 52. However, the movable mirrors 56 and 57 may be produced before the manufacture of the electrodes 541 and 542.

According to the respective embodiments, the bonding surfaces 51A and 52A are bonded via the bonding layers 53. However, the bonding surfaces 51A and 52A may be bonded to each other by so-called cold activation bonding which activates the bonding surfaces 51A and 52A, overlaps the activated bonding surfaces 51A and 52A with each other, and pressurizes the overlapped surfaces 51A and 52A for bonding without forming the bonding layers 53, for example. The method for this purpose may be arbitrarily selected.

According to the respective embodiments, an optical module in the appended claims is constituted by the colorimetric sensor 3, and a light analyzer in the appended claims is constituted by the colorimeter 1 including the colorimetric sensor 3. However, the optical module may be a gas sensor which introduces gas into the sensor and detects light included in incident light and absorbed by the gas. In this case, the light analyzer may be a gas detection device which analyzes and determines the gas introduced into the sensor by using the gas sensor. The light analyzer may be a spectral camera, a spectral analyzer or the like including the optical module.

The optical module may have a structure which varies the intensities of lights having different wavelengths as time elapses whereby data is transmitted by lights of respective wavelengths. In this case, the etalon 5 included in the optical module divides light having a particular wavelength and allows the light to be received by a light receiving unit for extraction of data transmitted by the light having the particular wavelength. The light analyzer equipped with this type of data extraction optical module can provide optical communication based on data processing associated with lights having respective wavelengths.

The entire disclosure of Japanese Patent Application No. 2010-253956, filed Nov. 12, 2010 is expressly incorporated by reference herein.

What is claimed is:

1. A wavelength variable interference filter, comprising:
a first substrate;
a second substrate disposed so as to be opposed to the first substrate;
a first reflection film provided on a surface of the first substrate that faces the second substrate;
a second reflection film provided on a surface of the second substrate that faces the first substrate, the second reflection film being disposed so as to be opposed to the first reflection film with a predetermined gap interposed therebetween; and
a gap varying unit which changes the length of the gap between the first reflection film and the second reflection film, the gap varying unit including a first electrode formed on the surface first substrate and a second electrode formed on the surface of second substrate,
wherein
the first substrate has a first movable portion on which the first reflection film is disposed, and a first linkage portion which holds the first movable portion in such a manner that the first movable portion can shift in the thickness direction of the first substrate,
the second substrate has a second movable portion on which the second reflection film is disposed, and a second linkage portion which holds the second movable portion in such a manner that the second movable portion can shift in the thickness direction of the second substrate,
the gap varying unit varies the length of the gap by shifting the first movable portion and the second movable portion relative to each other by changing an interaction force between the first movable portion and the second movable portion,
a thickness of the first movable portion is greater than a thickness of the first linkage portion, and a thickness of the second movable portion is greater than a thickness of the second linkage portion,
the first and second linkage portions have the same thickness, and
a shape of the first linkage portion matches a shape of the second linkage portion in a plan view from the thickness direction of the first substrate and the second substrate.

2. The wavelength variable interference filter according to claim 1, wherein
the first substrate has a first displacement unit provided with the first movable portion and the first linkage portion;
the second substrate has a second displacement unit provided with the second movable portion and the second linkage portion; and
the first displacement unit and the second displacement unit are made of the same material and have the same shape.

3. The wavelength variable interference filter according to claim 2, wherein
the first displacement unit has a linearly symmetric shape with respect to a symmetry axis corresponding to a line which passes through the center line of the first linkage portion in the thickness direction of the first substrate and extending in parallel with the surface of the first reflection film in the cross-sectional view taken in the thickness direction of the first substrate; and
the second displacement unit has a linearly symmetric shape with respect to a symmetry axis corresponding to a line which passes through the center line of the second linkage portion in the thickness direction of the second substrate and extending in parallel with the surface of the second reflection film in the cross-sectional view taken in the thickness direction of the second substrate.

4. The wavelength variable interference filter according to claim 1, wherein the first substrate and the second substrate are made of the same material and have the same shape.

5. The wavelength variable interference filter according to claim 1, wherein
a first bend prevention film is provided on the surface of the first substrate opposite to the surface where the first electrode is disposed as a bend prevention film made of the same material as that of the first electrode, and on the surface of the second substrate opposite to the surface where the second electrode is disposed as a bend prevention film made of the same material as that of the second electrode; and
a second bend prevention film is provided on the surface of the first substrate opposite to the surface where the first reflection film is disposed as a bend prevention film made of the same material as that of the first reflection film, and on the surface of the second substrate opposite to the surface where the second reflection film is disposed as a bend prevention film made of the same material as that of the second reflection film.

6. An optical module comprising
the wavelength variable interference filter according to claim 1; and
a light receiving unit which receives test target light transmitted by the wavelength variable interference filter.

7. A light analyzer comprising
the optical module according to claim 6; and
an analyzing unit which analyzes light characteristics of the test target light based on light received by the light receiving unit of the optical module.

8. The wavelength interference filter according to claim 1, wherein the interaction force is an electrostatic attractive force that pulls the first and second movable portions toward each other.

* * * * *